(12) United States Patent
Ikeda et al.

(10) Patent No.: US 12,330,145 B2
(45) Date of Patent: Jun. 17, 2025

(54) SUPPORTED CATALYST SYNTHESIS DEVICE AND FINE PARTICLE SYNTHESIS DEVICE

(71) Applicant: FURUYA METAL CO., LTD., Tokyo (JP)

(72) Inventors: Yasuyuki Ikeda, Tokyo (JP); Kenji Terada, Tokyo (JP)

(73) Assignee: FURUYA METAL CO., LTD., Toshima-Ku (JP)

( * ) Notice: Subject to any disclaimer, the term of this patent is extended or adjusted under 35 U.S.C. 154(b) by 770 days.

(21) Appl. No.: 17/621,751

(22) PCT Filed: Jun. 16, 2020

(86) PCT No.: PCT/JP2020/023634
§ 371 (c)(1),
(2) Date: Dec. 22, 2021

(87) PCT Pub. No.: WO2020/262121
PCT Pub. Date: Dec. 30, 2020

(65) Prior Publication Data
US 2022/0347669 A1    Nov. 3, 2022

(30) Foreign Application Priority Data

Jun. 26, 2019    (JP) ................. 2019-118840

(51) Int. Cl.
*B01J 37/16* (2006.01)
*B01J 37/04* (2006.01)
*B01J 37/08* (2006.01)

(52) U.S. Cl.
CPC .............. *B01J 37/16* (2013.01); *B01J 37/04* (2013.01); *B01J 37/08* (2013.01)

(58) Field of Classification Search
CPC ... B01J 37/16; B01J 37/04; B01J 37/08; B01J 8/00; B01J 8/0095; B01J 8/08; B01J 8/0015; B01J 8/087; B01J 14/00
(Continued)

(56) References Cited

U.S. PATENT DOCUMENTS

2020/0001370 A1    1/2020    Kitagawa et al.

FOREIGN PATENT DOCUMENTS

| JP | 2014108380 A |   | 6/2014 |   |
| JP | 2018141235 A | * | 9/2018 | ............. B01J 23/46 |

(Continued)

OTHER PUBLICATIONS

International Search Report dated Sep. 1, 2020 for PCT Appl. No. PCT/JP2020/023634.
(Continued)

*Primary Examiner* — Patricia L. Hailey
(74) *Attorney, Agent, or Firm* — Ohlandt, Greeley and Perle, L.L.P.

(57) ABSTRACT

The supported catalyst synthesis device according to the present disclosure includes a first source for a liquid containing a reducing agent; a second source for a liquid containing elements to constitute single-metal fine particles or solid solution fine particles to be supported; a third source for a liquid containing support particles; a reaction unit that joins flows of these liquids; a liquid feed route connecting between the first source and the reaction unit; a liquid feed route connecting between the second source and the reaction unit; a liquid feed route connecting between the third source and the reaction unit; and a collection unit, connected to the reaction unit via a pipe, to collect a produced reaction product, and further includes a pressure adjustment mechanism connected to the collection unit.

10 Claims, 8 Drawing Sheets

(58) Field of Classification Search
USPC ....... 502/326; 422/213, 232; 137/3, 14, 255, 137/602, 896
See application file for complete search history.

(56) References Cited

FOREIGN PATENT DOCUMENTS

| WO | WO-2008036762 A1 * | 3/2008 | ............. B01J 23/40 |
| WO | WO-2015104025 A1 * | 7/2015 | ............. B01J 23/63 |
| WO | WO-2016036745 A1 * | 3/2016 | .......... B01J 19/0066 |
| WO | 2016136956 A1 | 9/2016 | |
| WO | 2017150596 A1 | 9/2017 | |

OTHER PUBLICATIONS

Chinese Office Action (with English translation) dated Apr. 12, 2024 for Chinese Appl. No. 2020800043954.4.
International Preliminary Report on Patentability (IPRP) dated Dec. 28, 2021 for PCT Appl. No. PCT/JP2020/023634.

* cited by examiner

SUPPORTED CATALYST SYNTHESIS DEVICE AND FINE PARTICLE SYNTHESIS DEVICE

BACKGROUND

1. Field of the Disclosure

The present disclosure relates to a supported catalyst synthesis device capable of continuously synthesizing a supported catalyst (hereinafter, also referred to as a supported catalyst) in which single-metal fine particles or solid solution fine particles are supported on support particles, and a fine particle synthesis device capable of continuously synthesizing single-metal fine particles or solid solution fine particles.

2. Discussion of the Background Art

In general, catalysts containing rare metals have utilized as catalysts used for exhaust gas purification process for automobiles and the like or catalysts used for various reaction processes such as compound synthesis. However, since rare metals are expensive and produced in a small amount, solid solution fine particles, which are known as having high activity with reduced amount of rare metals to use, have attracted attention, and accordingly, solid solution fine particles has been progressively developed.

In the synthesis of such solid solution fine particles, a batch-wise synthesis is carried out in which a noble metal salt solution is gradually added to a high boiling point reducing agent such as triethylene glycol being heated to a high temperature. However, since the concentration of the noble metal present in the reducing agent solution to be synthesized gradually increases, there is a problem that the particle size becomes coarse, making it difficult to mass-produce alloys having a small particle size.

In recent years, there has been a need for a catalyst having higher activity with a reduced amount of noble metal, and also an industrial need for mass production of a supported catalyst in which solid solution fine particles of 1 nm or less are supported on support particles. As a means for preventing such coarsening of solid solution fine particles, there is a method for synthesizing solid solution fine particles using a microreactor (see, for example, PTL 1). By reacting a palladium metal salt solution and a ruthenium metal salt solution in a microreactor under pressure in the presence of a reducing agent, solid solution fine particles of palladium and ruthenium are produced.

CITATION LIST

Patent Literature

[PTL 1] Japanese Unexamined Patent Publication No.

SUMMARY

Technical Problem

However, according to the technique described in PTL 1, the average particle size is at least 2.2 nm, and in order to obtain activated particles for use as a catalyst, there is a need for a small particle size of 0.5 to 2 nm, preferably a small particle size of 1 nm or less, so that the particles have a larger surface area. Further, it fails to show any examples of synthesizing a supported catalyst, and also fails to show any structures capable of stable introduction of support particles, necessary for synthesizing the supported catalyst, into the system.

Although the achievement of mass synthesis of solid solution fine particles has been obtained in PTL 1, it is necessary to further reduce the particle size of the solid solution fine particles. In other words, there is a problem that the reducing power required to reduce the particle size is insufficient, and accordingly, the reaction is required to proceed with further increased reducing power. In addition, there is a problem that a mass production apparatus is required to further reduce the particle size.

Further, in PTL 1, the supported catalyst is not synthesized in an apparatus. Furthermore, in terms of stable mass-production of the supported catalyst with the support particles being introduced, PTL 1 has a fatal drawback that the flow of the support particles in a back pressure valve is not considered. In other words, there is a problem that when the support particles, which are solid particles, are introduced into the apparatus, the support particles are retained in and block the back pressure valve, making it impossible for the synthesis reaction to proceed at a desired flow velocity, pressure, and temperature. Further, there is a problem that a mass production apparatus is required to avoid the retention and blocking of the support particles.

Therefore, an object of the present disclosure is to provide a supported catalyst synthesis device capable of decreasing the particle size of single-metal fine particles or solid solution fine particles to about 0.5 to 2 nm and achieving stable mass-production of a supported catalyst in which the single-metal fine particles or solid solution fine particles are supported on support particles. Another object is to provide a fine particle synthesis device capable of decreasing the particle size of the single-metal fine particles or solid solution fine particles to about 0.5 to 2 nm and achieving stable mass-production of the fine particles.

Solution to Problem

As a result of diligent studies to solve the above-described problems, the inventors have found solution for the problems and made the present invention by means of disposing a mechanism that controls a pressure at a place where (1) flows of a liquid containing a reducing agent and a liquid containing elements to constitute single-metal fine particles or solid solution fine particles, or (2) flows of a liquid containing a reducing agent, a liquid containing elements to constitute single-metal fine particles or solid solution fine particles to be supported, and a liquid containing support particles, are joined to react the liquids, and a resulting reaction product is collected. Specifically, a supported catalyst synthesis device according to the present invention includes, at least, a first source for a liquid containing a reducing agent; a second source for a liquid containing elements to constitute single-metal fine particles or solid solution fine particles to be supported; a third source for a liquid containing support particles; a reaction unit (D) that joins flows of the liquid containing the reducing agent, the liquid containing the elements to constitute the single-metal fine particles or solid solution fine particles to be supported, and the liquid containing the support particles; a liquid feed route (A) connecting between the first source and the reaction unit (D); a liquid feed route (B) connecting between the second source and the reaction unit (D); a liquid feed route (C) connecting between the third source and the reaction unit (D); and a collection unit (E), connected to the reaction unit (D) via a pipe, to collect a produced reaction product, and the supported catalyst synthesis device further includes a pressure adjustment mechanism (F) connected to the collection unit (E).

The supported catalyst synthesis device according to the present invention preferably further includes a mechanism (G) that transfers a liquid flowing through either the liquid feed route (B) or the liquid feed route (C) or both, in one direction. This enables stable definition of flow rate and flow velocity of the liquid containing the elements to constitute the single-metal fine particles or solid solution fine particles to be supported and the liquid containing support particles through the liquid feed route (B) and the liquid feed route (C), so that stable synthesis of a supported catalyst can be performed.

In the supported catalyst synthesis device according to the present invention, the liquid feed route (C) preferably includes a stirring mechanism (H). This makes it possible to prevent the support particles having a specific density higher than that of water from settling in a pump and thus to keep the concentration of the support particles fed to the reaction unit.

The supported catalyst synthesis device according to the present invention preferably further includes a heating and heat retention mechanism (I) in the liquid feed route (A). By heating the liquid containing the reducing agent from room temperature to a temperature required for the reaction, an amount of heat required for the reduction can be applied.

The supported catalyst synthesis device according to the present invention preferably further includes a cooling mechanism (J2) between the reaction unit (D) and the collection unit (E). By quenching the liquid containing the supported catalyst produced in the reaction unit (D), the sintering of single-metal fine particles or the sintering of solid solution fine particles can be suppressed.

A fine particle synthesis device according to the present invention includes, at least, a first source for a liquid containing a reducing agent; a second source for a liquid containing elements to constitute single-metal fine particles or solid solution fine particles; a reaction unit (D) that joins flows of the liquid containing the reducing agent, and the liquid containing the elements to constitute the single-metal fine particles or solid solution fine particles; a liquid feed route (A) connecting between the first source and the reaction unit (D); a liquid feed route (B) connecting between the second source and the reaction unit (D); and a collection unit (E), connected to the reaction unit (D) via a pipe, to collect a produced reaction product, and the fine particle synthesis device further includes a pressure adjustment mechanism (F) connected to the collection unit (E).

The fine particle synthesis device according to the present invention preferably further includes a mechanism (G) that transfers a liquid flowing through the liquid feed route (B) in one direction. This enables the stable definition of the flow rate and flow velocity of the liquid containing the elements to constitute the single-metal fine particles or solid solution fine particles through the liquid feed route (B), so that stable synthesis of the fine particles can be performed.

The fine particle synthesis device according to the present invention preferably further includes a heating and heat retention mechanism (I) in the liquid feed route (A). By heating the liquid containing the reducing agent from room temperature to a temperature required for the reaction, an amount of heat required for the reduction can be applied.

The fine particle synthesis device according to the present invention preferably further includes a cooling mechanism (J2) between the reaction unit (D) and the collection unit (E). By quenching the liquid containing the single-metal fine particles or solid solution fine particles produced in the reaction unit (D), the sintering of single-metal fine particles or the sintering of solid solution fine particles can be suppressed.

Advantageous Effects of Invention

According to the present disclosure, it is possible to provide a supported catalyst synthesis device capable of decreasing the particle size of single-metal fine particles or solid solution fine particles to about 0.5 to 2 nm and achieving stable mass-production of a supported catalyst in which the single-metal fine particles or solid solution fine particles are supported on support particles. It is also possible to provide a fine particle synthesis device capable of decreasing the particle size of the single-metal fine particles or solid solution fine particles to about 0.5 to 2 nm and achieving stable mass-production of the fine particles.

DETAILED DESCRIPTION OF THE PREFERRED EMBODIMENT

Hereinafter, the present invention will be described in detail by means of embodiments, but the present invention is not construed as being limited to these descriptions. The embodiments may be modified in various ways as long as the effects of the present invention are exhibited.

Supported Catalyst Synthesis Device

Figure 1:
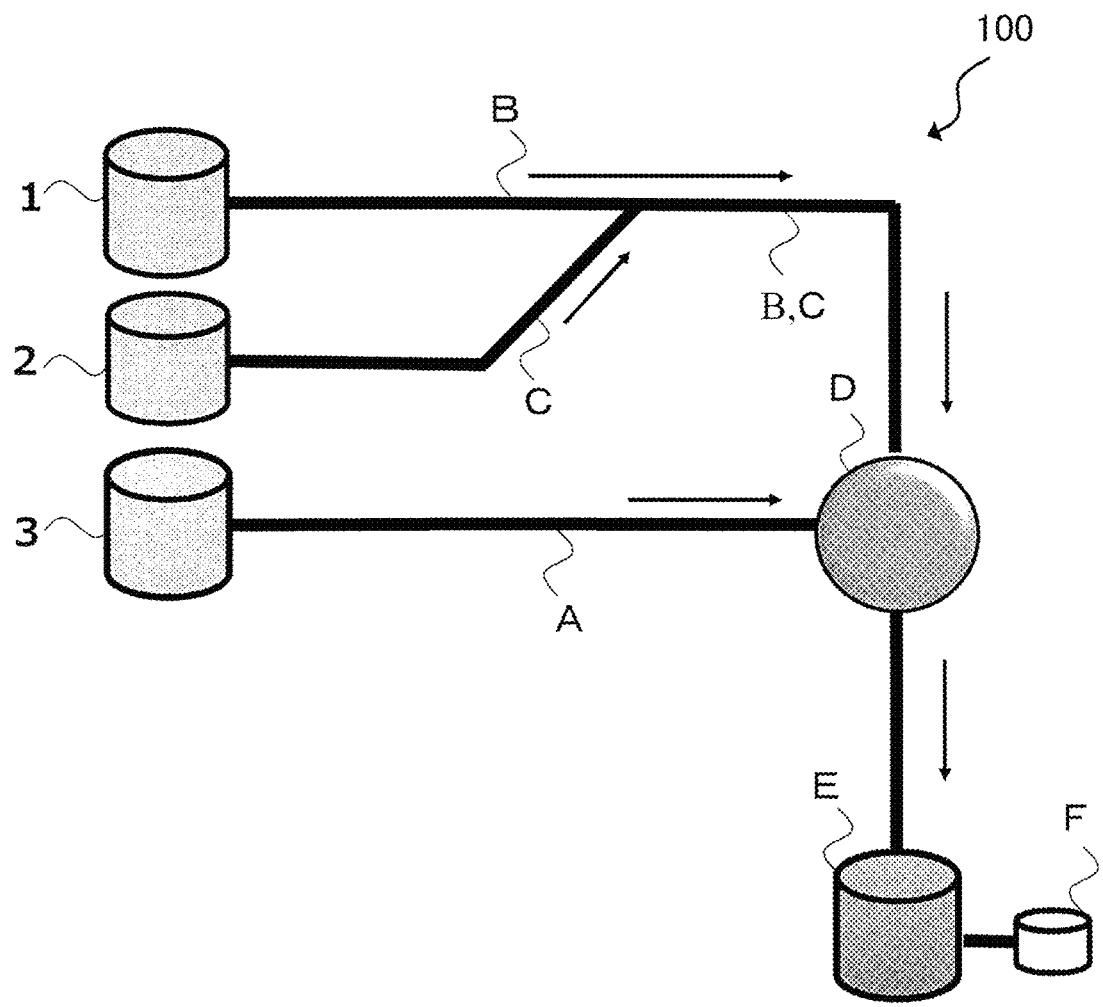
FIG. 1 is a schematic diagram of a first example of a supported catalyst synthesis device according to the embodiment.

A supported catalyst synthesis device will be described with reference to FIG. 1. A supported catalyst synthesis device 100 according to the embodiment includes, at least, a first source 3 for a liquid containing a reducing agent; a second source 1 for a liquid containing elements to constitute single-metal fine particles or solid solution fine particles to be supported; a third source 2 for a liquid containing support particles; a reaction unit (D) that joins flows of the liquid containing the reducing agent, the liquid containing the elements to constitute the single-metal fine particles or solid solution fine particles to be supported, and the liquid containing the support particles; a liquid feed route (A) connecting between the first source 3 and the reaction unit (D); a liquid feed route (B) connecting between the second source 1 and the reaction unit (D); a liquid feed route (C) connecting between the third source 2 and the reaction unit (D); and a collection unit (E), connected to the reaction unit (D) via a pipe, to collect a produced reaction product, and further includes a pressure adjustment mechanism (F) connected to the collection unit (E). The supported catalyst synthesis device according to the embodiment makes it possible to control the pressure inside the device without using a back pressure valve, and makes it less likely for slurry to clog up the device, which is a problem, so that stable synthesis of a supported catalyst can be performed.

The supported catalyst synthesis device according to the embodiment can reduce the liquid containing the elements to constitute the single-metal fine particles or solid solution fine particles to be supported to produce the single-metal fine particles or solid solution fine particles in the reaction unit (D), and cause the single-metal fine particles or solid solution fine particles produced by reduction to be supported on the support particles.

The first source 3 for the liquid containing the reducing agent is preferably a container for storing the liquid containing the reducing agent. As the reducing agent, a reducible organic solvent may be used such as methanol, ethanol, n-propanol, isopropanol, n-butanol, ethylene glycol, triethylene glycol, trimethylene glycol, or diethylene glycol, which may be diluted with a solvent such as water, and, furthermore, may contain an alkali, an organic acid or the like added to a solvent such as water to adjust reducing property.

The second source 1 for the liquid containing the elements to constitute the single-metal fine particles or solid solution fine particles to be supported is preferably a container for storing the liquid containing the elements to constitute the single-metal fine particles or solid solution fine particles to be supported. Examples of the elements to constitute the single-metal fine particles or solid solution fine particles include palladium, ruthenium, rhodium, silver, osmium, iridium, platinum, gold, molybdenum, rhenium, tungsten, 3d transition element, carbon, and boron. Among these elements, a raw material containing one kind of metal element is used to produce single-metal fine particles. This raw material is dissolved in a liquid such as water to prepare a raw material solution. Among these elements, raw materials containing two or more kinds of metal elements is used to produce solid solution fine particles. These metal materials are dissolved in a liquid such as water to prepare a raw material solution. As a combination of the two or more kinds of metal elements, there are a combination to form a solid solution, a combination not to form a solid solution, and a combination to form an intermetallic compound, in the alloy phase diagram.

The third source 2 for the liquid containing the support particles is preferably a container for storing the liquid containing the support particles. Examples of the kinds of the support particles include silica, alumina, ceria, zirconia, ceria zirconia, titania, magnesia, tin oxide, activated carbon, carbon black, acetylene black, carbon nanotubes, carbon nanofibers, and carbon nanohorns. The liquid containing the support particles is a liquid in which the support particles are dispersed with a dispersion medium, and the dispersion medium is, for example, water. The dispersion medium may appropriately contain a reducing organic solvent such as methanol, ethanol, n-propanol, isopropanol, n-butanol, ethylene glycol, triethylene glycol, trimethylene glycol, or diethylene glycol, and an alkali, an organic acid, or the like may be added to the dispersion medium to adjust reducing property as appropriate.

The liquid feed route (A) connecting between the first source 3 and the reaction unit (D) includes a pipe. As a means for adjusting flow rate of liquid flowing through the pipe, there is a method of placing the first source 3 at a position higher than that of the reaction unit (D) to use the height difference therebetween. In this case, the liquid containing the reducing agent can be carried only by the pipe. In this case, a valve for reducing the flow rate, such as a needle valve or a stop valve, may be placed in the liquid feed route (A).

The liquid feed route (B) connecting between the second source 1 and the reaction unit (D) includes a pipe. As a means for adjusting flow rate of liquid flowing through the pipe, there is a method of placing the second source 1 at a position higher than that of the reaction unit (D) to use the height difference therebetween. In this case, similarly to the liquid feed route (A), a valve for reducing the flow rate, such as a needle valve or a stop valve, may be placed in the liquid feed route (B).

The liquid feed route (C) connecting between the third source 2 and the reaction unit (D) includes a pipe. As a means for adjusting flow rate of liquid flowing through the pipe, there is a method of placing the third source 2 at a position higher than that of the reaction unit (D) to use the height difference therebetween. In this case, similarly to the liquid feed route (A), a valve for reducing the flow rate, such as a needle valve or a stop valve, may be placed in the liquid feed route (C).

The liquid feed route (B) and the liquid feed route (C) may be separately connected to the reaction unit (D). As illustrated in FIG. 1, the liquid feed route (B) and the liquid feed route (C) may be merged before reaching the reaction unit (D), and the merged shared route (B, C) may be connected to the reaction unit (D).

The supported catalyst synthesis device according to the embodiment preferably further includes a mechanism (G) that transfers the liquid flowing through either the liquid feed route (B) or the liquid feed route (C) or both, in one direction. In a supported catalyst synthesis device 200 illustrated in FIG. 2, a form having the mechanisms (G) in both the liquid feed route (B) and the liquid feed route (C) is illustrated. This form enables stable definition of the flow rate and flow velocity of the liquid containing the elements to constitute the single-metal fine particles or solid solution fine particles to be supported and the liquid containing support particles in the liquid feed route (B) and the liquid feed route (C), so that stable synthesis of a supported catalyst can be performed.

Figure 2:
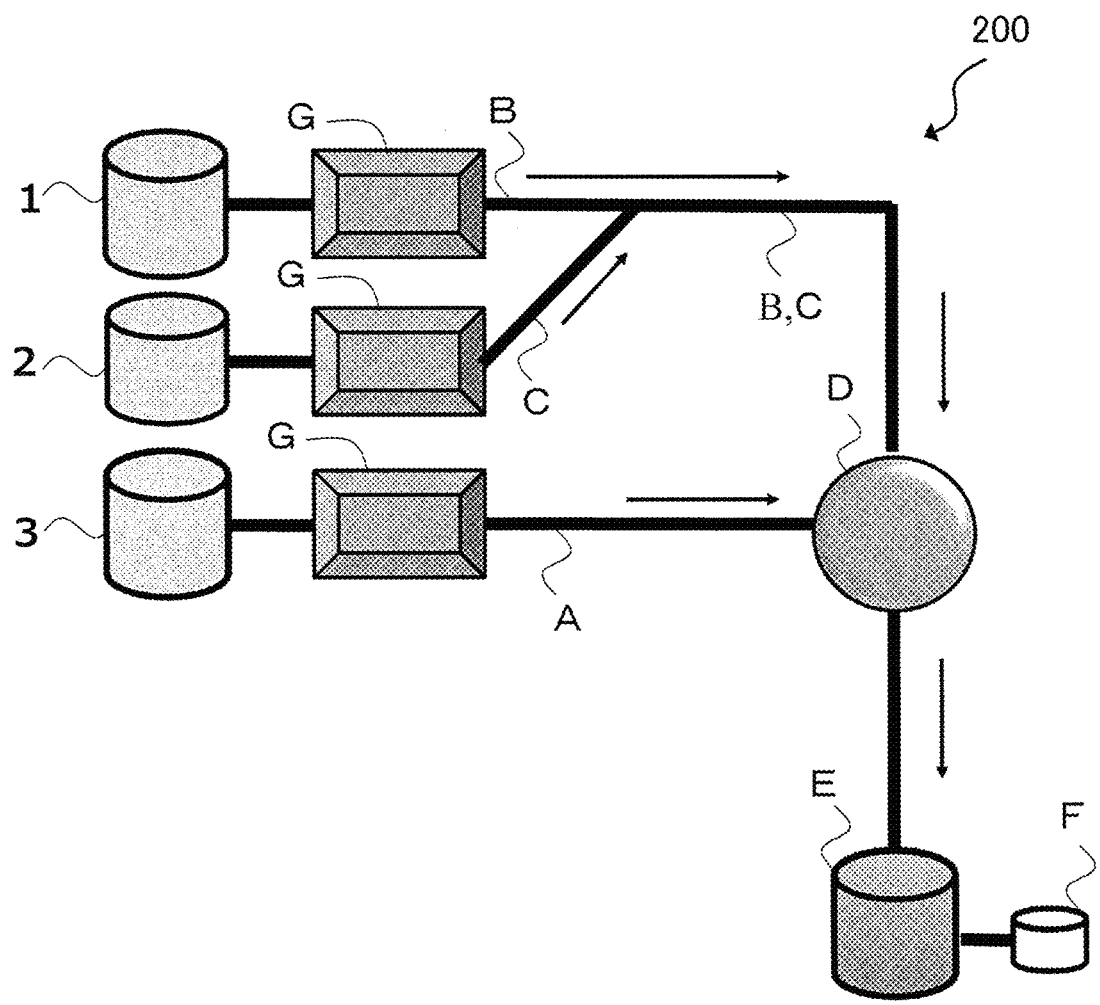
FIG. 2 is a schematic diagram of a second example of the supported catalyst synthesis device according to the embodiment.

As illustrated in FIG. 2, the supported catalyst synthesis device 200 according to the embodiment may further include a mechanism (G) that transfers the liquid flowing through the liquid feed route (A) in one direction. This form enables stable definition of the flow rate and flow velocity of the liquid containing the reducing agent in the liquid feed route (A), so that stable synthesis of a supported catalyst can be performed.

The mechanism (G) is a means for adjusting the flow rate of the liquid flowing through the pipe, such as a plunger, a cylinder, or a regulator, for example.

Figure 3:
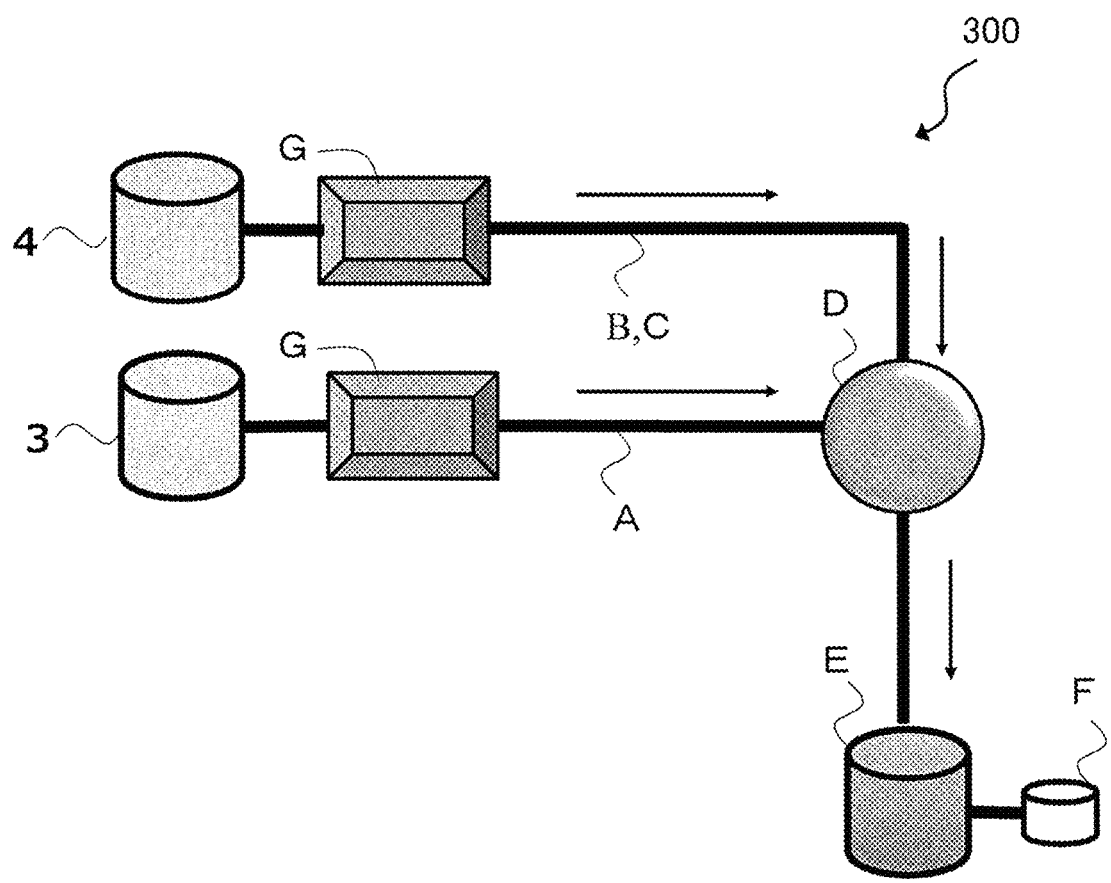
FIG. 3 is a schematic diagram of a third example of the supported catalyst synthesis device according to the embodiment.

As illustrated in FIG. 3, a supported catalyst synthesis device 300 according to the embodiment may include, instead of the second source 1 and the liquid feed route (B) and the third source 2 and the liquid feed route (C) as illustrated in FIG. 2, a fourth source 4 for storing a mixed liquid of a liquid containing elements to constitute single-metal fine particles or solid solution fine particles to be supported and a liquid containing support particles, and a shared route (B, C) serving both as the liquid feed route (B) and the liquid feed route (C).

Figure 4A:
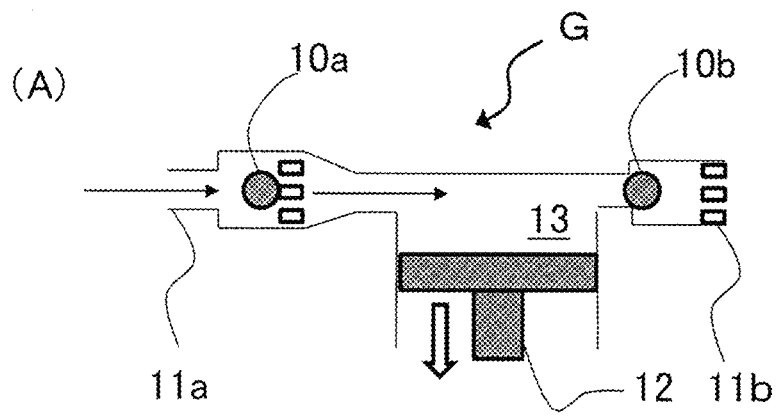
FIG. 4(A) is a schematic diagram illustrating an example of a mechanism (G) that transfers a liquid in one direction and is also a schematic diagram in case of pushing a plunger down.
Figure 4B:
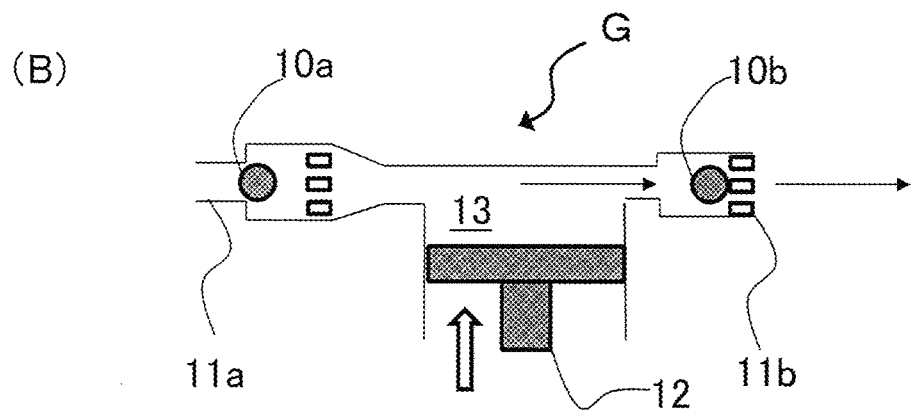
FIG. 4(B) is a schematic diagram illustrating an example of the mechanism (G) that transfers the liquid in one direction and is also a schematic diagram in case of pushing the plunger up.

Next, reference is made to FIG. 4(A) and FIG. 4(B). FIG. 4(A) and FIG. 4(B) are schematic diagrams illustrating examples of a mechanism (G) that transfers the liquid in one direction. FIG. 4(A) is a schematic diagram in case of pushing a plunger down, and FIG. 4(B) is a schematic diagram in case of pushing the plunger up. As illustrated in FIG. 4(A), when a plunger 12 is pushed down, a discharge side ball 10b closes a discharge side pipe 11b, and an inhalation side ball 10a opens an inhalation side pipe 11a. As a result, volume of a space 13 increases and an amount of liquid stored therein also increases. Next, as illustrated in FIG. 4(B), when the plunger 12 is pushed up, the discharge side ball 10b opens the discharge side pipe 11b, and the inhalation side ball 10a closes the inhalation side pipe 11a. As a result, the volume of the space 13 decreases and the amount of the liquid stored also decreases, and the reduced amount of liquid stored becomes an amount of liquid discharged from the discharge side. In the liquid feed route (B), the liquid feed route (C), and the liquid feed route (A), the mechanism (G) adjusts liquid feeding amount and prevents backflow, so that liquid can be continuously transferred to the reaction unit (D) at a constant flow rate without pulsation. The plunger may be a single plunger type, a double plunger type, a roller pump type, or a syringe pump type. In FIG. 4(A) and FIG. 4(B), a solenoid valve or a ball valve may be used instead of the check valve using the inhalation side ball 10a and the discharge side ball 10b. Further, a diaphragm may be used instead of the plunger.

Figure 5:
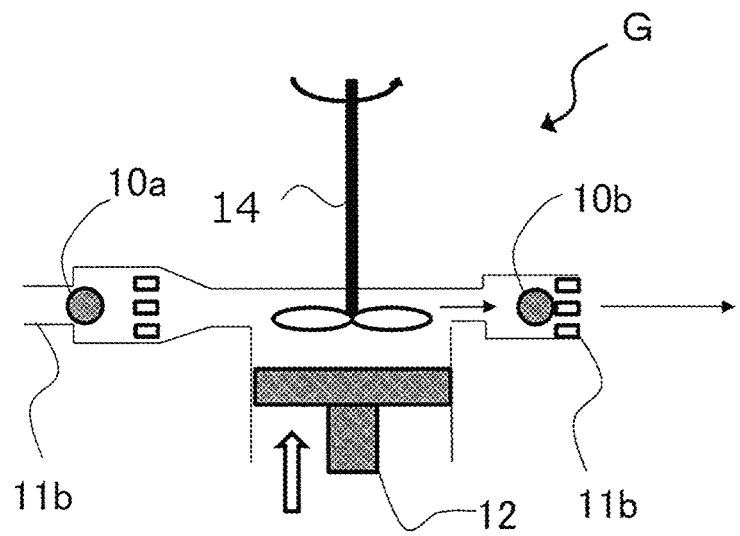
FIG. 5 is a schematic diagram illustrating an example of the mechanism (G) that transfers a liquid in one direction and further includes a stirring mechanism (H).

In the supported catalyst synthesis device according to the embodiment, the liquid feed route (C) preferably includes a stirring mechanism (H). In the case where the mechanism (G) is provided to transfer the support particles from the liquid feed route (C) to the reaction unit (D), the support particles may sink down at the inside of the mechanism (G). Therefore, by providing the stirring mechanism (H) in the mechanism (G), the support particles can be prevented from sinking down at the inside of the mechanism (G) and the support particles can be uniformly transferred to the reaction unit (D). FIG. 5 is a schematic diagram illustrating an example of the mechanism (G) that transfers the liquid in one direction further includes the stirring mechanism (H). The stirring mechanism (H) is, for example, a stirring impeller 14 illustrated in FIG. 5. Other examples of the stirring mechanism (H) include a liquid circulation device, a stirrer, and the like.

The reaction unit (D) is a reaction container for joining the flows of the liquid containing the reducing agent, the liquid containing the elements to constitute the single-metal fine particles or solid solution fine particles to be supported, and the liquid containing the support particles at one place. It is also possible to control the reaction conditions by selecting and adjusting the shape and volume of the reaction container and how to flow the liquid in the container as appropriate. The reaction container also includes a pipe-shaped container. The reaction unit (D) is preferably a pressure container so that the reaction can proceed under pressure. Further, the reaction unit (D) may include a heating means for heating the liquid contained therein, and the heating means may be, for example, a resistance heating element, a far-infrared irradiation device, a microwave irradiation device, direct energization heating, dielectric heating, induction heating, an electric furnace, a heater, or the like.

The collection unit (E) is a container that is connected to the reaction unit (D) via a pipe to collect a produced reaction product. The collection unit (E) is preferably a pressure container so that the reaction can proceed under pressure in the reaction unit (D).

The pressure adjustment mechanism (F) is connected to the collection unit (E). The pressure adjustment mechanism (F) may be connected to the collection unit (E) via a pipe. Further, the pressure adjustment mechanism (F) may be connected to the collection unit (E) in an integrated manner. Examples of the pressure adjustment mechanism (F) include a pressurizing and depressurizing means such as a plunger, a cylinder, and a regulator, and the pressure adjustment mechanism (F) is preferably a cylinder that is less likely to cause wear or clogging of the device. The pressure adjustment mechanism (F) adjusts the pressure inside the collection unit (E) and the pressure inside the reaction unit (D) connected to the collection unit (E) via the pipe. Since the liquid feed route (A), the liquid feed route (B), and the liquid feed route (C), which are on the upstream side of the reaction unit (D), are also connected to the reaction unit (D), the internal space of the route is under a pressure. However, the liquid is fed toward the reaction unit (D) at a higher pressure. When the liquid containing supports on which single-metal fine particles or solid solution fine particles are supported is collected by the collection unit (E), the pressure in the collection unit (E) is adjusted by the pressure adjustment mechanism (F) so as to adjust the pressure in the reaction unit (D), and as a result, the reduction of the elements to constitute the single-metal fine particles or solid solution fine particles is promoted in the reaction unit (D). In order to make conditions for the promoting reduction, it is preferable to give high energy. In order to make the conditions that can promote reduction, it is preferable to give high energy, and the pressure adjusting mechanism (F) in the collection unit (E) prevents the reducing agent from boiling while raising the temperature in the reaction unit (D). It is possible to adjust the pressure.

Figure 6:
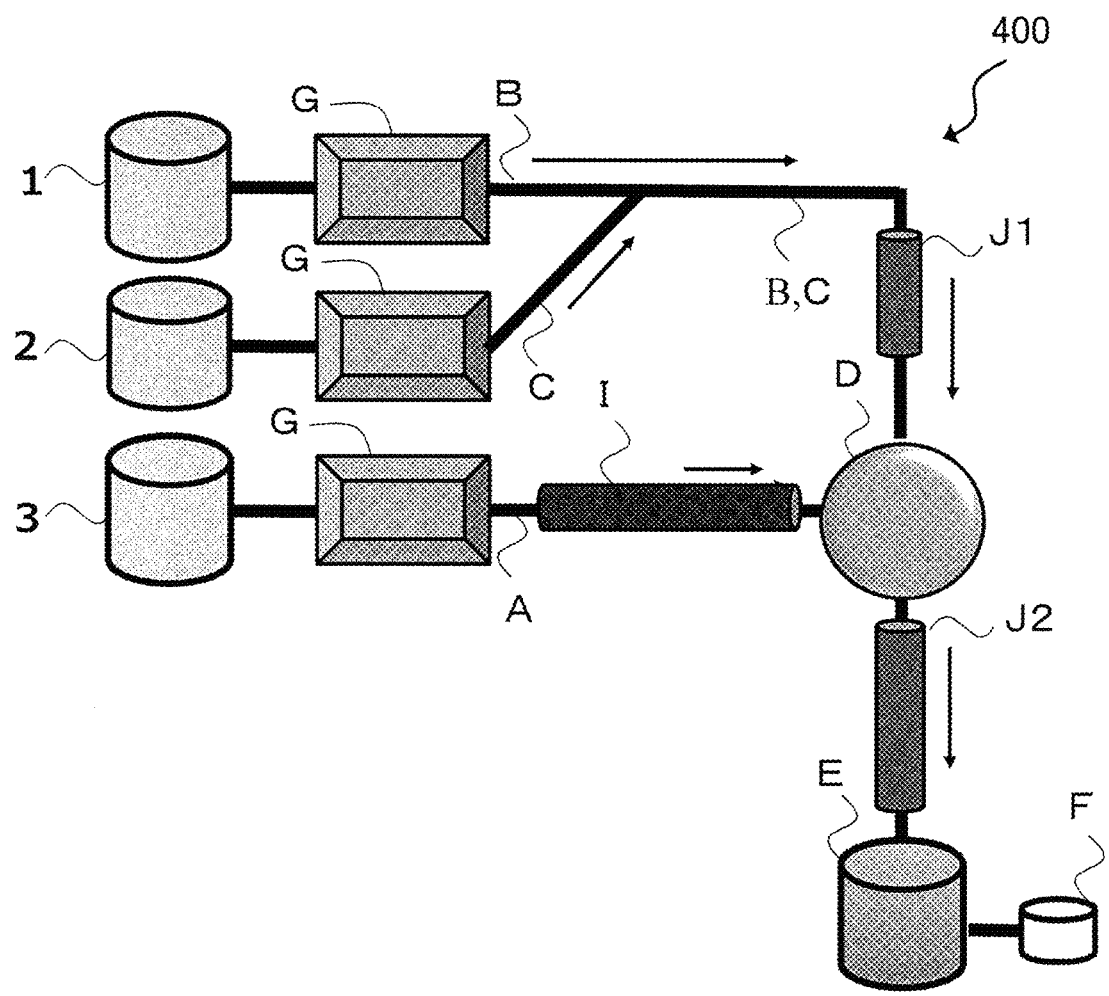
FIG. 6 is a schematic diagram of a fourth example of the supported catalyst synthesis device according to the embodiment in which the second example of the supported catalyst synthesis device further includes a heating and heat retention mechanism (I) and a cooling mechanism (J1, J2).

As illustrated in FIG. 6, a supported catalyst synthesis device 400 according to the embodiment preferably further includes a heating and heat retention mechanism (I) in the liquid feed route (A). By heating a liquid containing a reducing agent from room temperature to a temperature required for the reaction, the amount of heat required for the reduction can be given and the reactivity of the reducing agent can be improved. Example of the heating and heat retention mechanism (I) include direct energization heating, dielectric heating, induction heating, heating by an electric furnace or a heater, and the heating and heat retention mechanism (I) is more preferably direct energization heating, dielectric heating, or induction heating, which is known to have high responsiveness of the temperature control, and to avoid unexpected reduction of metal salts and the like due to heat transfer to the pipe.

As illustrated in FIG. 6, the supported catalyst synthesis device 400 according to the embodiment preferably further includes a cooling mechanism (J2) between the reaction unit (D) and the collection unit (E). By quenching the liquid containing the supported catalyst produced in the reaction unit (D), the sintering of single-metal fine particles or the sintering of solid solution fine particles can be suppressed. In order to further suppress the sintering of particles, the cooling mechanism (J2) is preferably provided as close to the reaction unit (D) as possible, and more preferably, the end closer to the reaction unit (D) of the ends of the cooling mechanism (J2) is provided at a position 1 to 1000 mm away from the reaction unit (D). The cooling mechanism (J2) is provided between the reaction unit (D) and the collection unit (E), and a cooling mechanism (J1) may be further provided in addition to the cooling mechanism (J2). The cooling mechanism (J1) may be provided at a place proximate to upstream side of the reaction unit (D) to which a liquid containing elements to constitute nanoparticles to be supported and a liquid containing support particles are guided through the liquid feed route (B) and the liquid feed route (C). In order to prevent unexpected metal precipitation due to the influence of heat transfer, the cooling mechanism (J1) may be provided in the liquid feed route (B) and/or the liquid feed route (C) as needed. Examples of the cooling means include water cooling and air cooling.

As an example of producing a supported catalyst using the supported catalyst synthesis device according to the embodiment, a liquid containing an ethanol-containing aqueous solution as a reducing agent is put into the first source 3, heated from room temperature to 450° C. by using a heater of the heating and heat retention mechanism (I) in the liquid feed route (A) via which the reducing agent is transferred, and then transferred to the reaction unit (D). As a liquid containing a single-metal element to be supported, a Pd raw material solution and a Ru raw material solution are put into the second source 1 and transferred to the reaction unit (D) via the liquid feed route (B). A liquid containing alumina as the support to support is put into the third source 2, and the flowing liquid is transferred to the reaction unit (D) while operating the mechanism (G) and the stirring mechanism (H) for transferring the flowing liquid in one direction. After the flows of the ethanol-containing aqueous solution, Pd raw material solution, Ru raw material solution, and alumina are joined at the reaction unit (D), the Pd raw material and Ru raw material are simultaneously reduced on the alumina by the ethanol-containing aqueous solution, while the Pd elements and Ru elements are combined to produce solid solution fine particles, and the solid solution fine particles are supported on alumina to produce a supporting catalyst. The produced supported catalyst is quenched to room temperature using water cooling of the cooling mechanism (J2). The quenching suppresses the sintering of particles. The quenched supported catalyst is collected in the collection unit (E) connected to the pressure adjustment mechanism (F), and the pressure is controlled to 0.1 MPa to 138 MPa to suppress the boiling of the reducing agent. By increasing the pressure, the pressure of the entire device is increased, and the activity of the reaction in the reaction unit (D) is improved.

Fine Particle Synthesis Device

Next, a fine particle synthesis device will be described, but since the description includes the same contents as that of the supported catalyst synthesis device, the following description will be focused on the differences.

Figure 7:
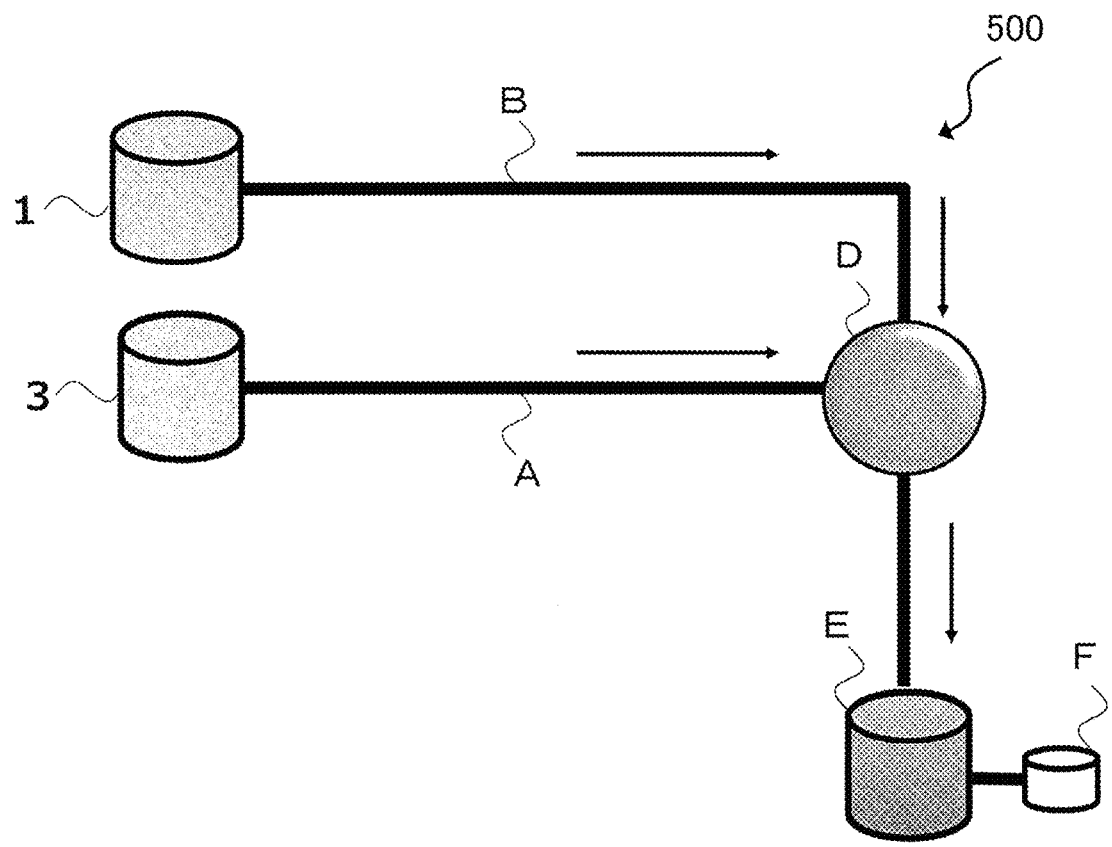
FIG. 7 is a schematic diagram of a first example of a fine particle synthesis device according to the embodiment.

First, the fine particle synthesis device will be described with reference to FIG. 7. A fine particle synthesis device 500 according to the embodiment includes, at least, a first source 3 for a liquid containing a reducing agent; a second source 1 for a liquid containing elements to constitute single-metal fine particles or solid solution fine particles; a reaction unit (D) that joins flows of the liquid containing the reducing agent, and the liquid containing the elements to constitute the single-metal fine particles or solid solution fine particles; a liquid feed route (A) connecting between the first source 3 and the reaction unit (D); a liquid feed route (B) connecting between the second source 1 and the reaction unit (D); and a collection unit (E), connected to the reaction unit (D) via a pipe, to collect a produced reaction product, and the fine particle synthesis device further includes a pressure adjustment mechanism (F) connected to the collection unit (E). The fine particle synthesis device according to the embodiment makes it possible to control the pressure inside the device without using a back pressure valve, and makes it less likely for single-metal fine particles or solid solution fine particles to clog up the device, which is a problem, so that stable synthesis of single-metal fine particles or solid solution fine particles can be performed.

The fine particle synthesis device according to the embodiment can reduce, in the reaction unit (D), the liquid containing the elements to constitute the single-metal fine particles or solid solution fine particles to produce the single-metal fine particles or solid solution fine particles.

As to the first source 3, the kind of the reducing agent, the second source 1, the liquid feed route (A), the liquid feed route (B), the reaction unit (D), the collection unit (E), and the pressure adjustment mechanism (F), they are the same as those in the case of the supported catalyst synthesis device according to the embodiment. Further, the kind of the liquid containing the elements to constitute the single-metal fine particles or solid solution fine particles is the same as "the kind of the liquid containing the elements to constitute the single-metal fine particles or solid solution fine particles to be supported" for the supported catalyst synthesis device according to the embodiment.

Figure 8:
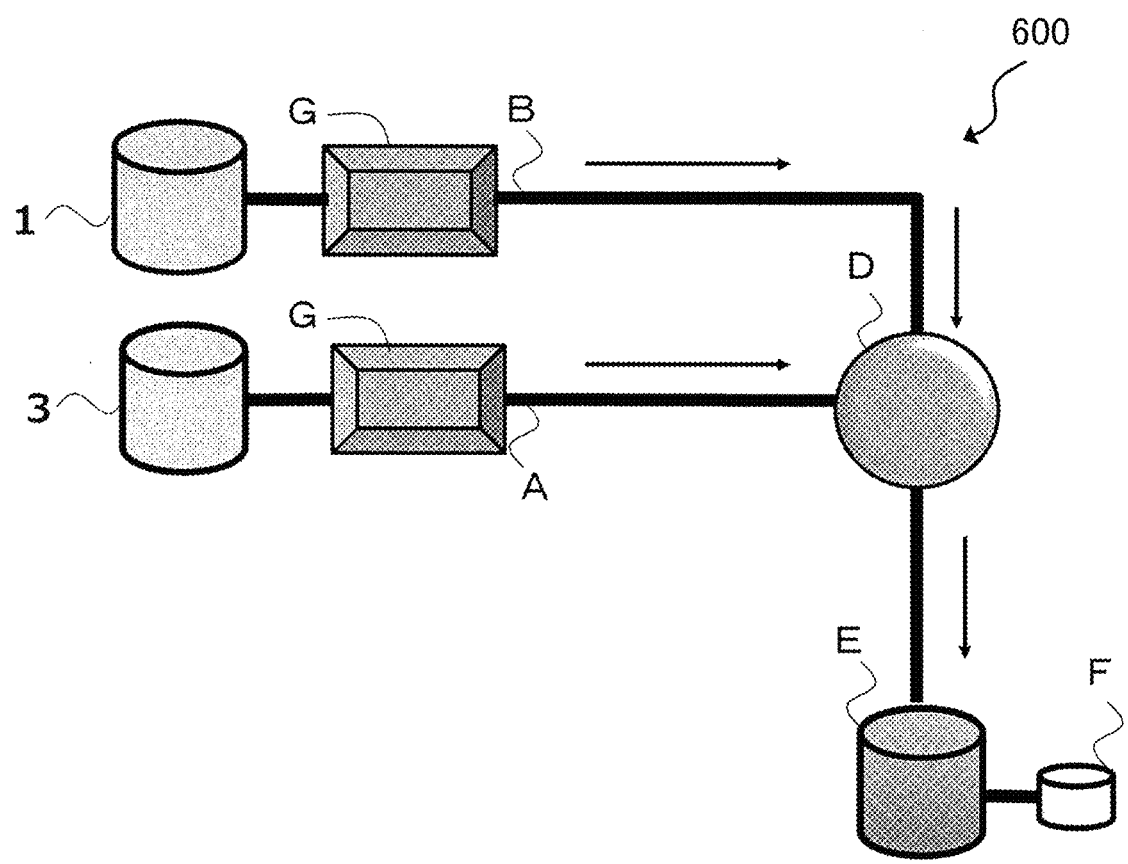
FIG. 8 is a schematic diagram of a second example of the fine particle synthesis device according to the embodiment.

The fine particle synthesis device according to the embodiment preferably further includes a mechanism (G) that transfers a liquid flowing through the liquid feed route (B) in one direction. This enables the stable definition of the flow rate and flow velocity of the liquid containing the elements to constitute the single-metal fine particles or solid solution fine particles in the liquid feed route (B), so that stable synthesis of the fine particles can be performed. In a fine particle synthesis device 600 illustrated in FIG. 8, a form having the mechanisms (G) in both the liquid feed route (B) and the liquid feed route (A) is illustrated. This form enables the stable definition of the flow rate and flow velocity of the liquid containing the elements to constitute the single-metal fine particles or solid solution fine particles and the liquid containing the reducing agent in the liquid feed route (B) and the liquid feed route (A), so that stable synthesis of fine particles can be performed.

The specific structure of the mechanism (G) is the same as that of the supported catalyst synthesis device according to the embodiment.

Figure 9:
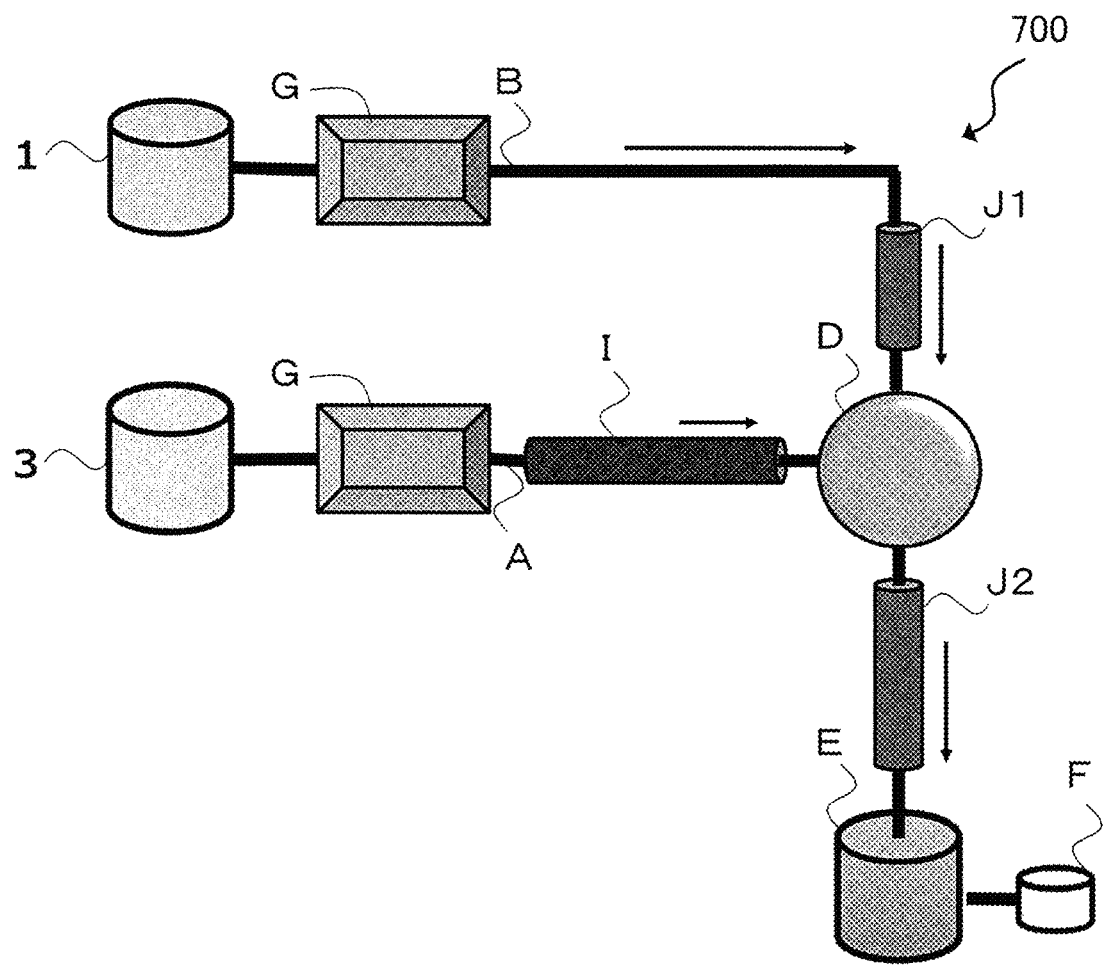
FIG. 9 is a schematic diagram of a third example of the fine particle synthesis device according to the embodiment in which the second example of the fine particle synthesis device further includes a heating and heat retention mechanism (I) and a cooling mechanism (J1, J2).

As illustrated in FIG. 9, a fine particle synthesis device according to the embodiment preferably further includes a heating and heat retention mechanism (I) in the liquid feed route (A). By heating the liquid containing the reducing agent from room temperature to a temperature required for the reaction, an amount of heat required for the reduction can be applied. The specific structure of the heating and heat retention mechanism (I) is the same as that of the supported catalyst synthesis device according to the embodiment.

As illustrated in FIG. 9, the fine particle synthesis device according to the embodiment preferably further includes a cooling mechanism (J2) between the reaction unit (D) and the collection unit (E). By quenching the liquid containing the single-metal fine particles or solid solution fine particles produced in the reaction unit (D), the sintering of particles can be suppressed. The specific structure of the cooling mechanism (J2) is the same as that of the supported catalyst synthesis device according to the embodiment. In addition to the cooling mechanism (J2), a cooling mechanism (J1) may be further provided. The cooling mechanism (J1) may be provided at a place proximate to upstream side of the reaction unit (D) to which a liquid containing elements to constitute nanoparticles are guided through the liquid feed route (B). In order to prevent unexpected metal precipitation due to the influence of heat transfer, the cooling mechanism (J1) may be provided in the liquid feed route (B) as needed. The specific structure of the cooling mechanism (J1) is the same as that of the supported catalyst synthesis device according to the embodiment.

As an example of producing fine particles using the fine particle synthesis device according to the embodiment, a liquid containing an ethanol-containing aqueous solution as a reducing agent is put into the first source 3, heated from room temperature to 450° C. by using a heater of the heating and heat retention mechanism (I) in the liquid feed route (A) via which the reducing agent is transferred, and then transferred to the reaction unit (D). As a liquid containing elements to constitute solid solution fine particles, a Pd raw material solution and a Ru raw material solution are put into the second source 1 and transferred to the reaction unit (D) via the liquid feed route (B). After the ethanol-containing aqueous solution, the Pd raw material solution and the Ru raw material solution are joined at the reaction unit (D), the Pd raw material and the Ru raw material are simultaneously reduced by the ethanol-containing aqueous solution, and the Pd element and the Ru element are combined to form solid solution fine particles. The produced solid solution fine particles are quenched to room temperature using water cooling of the cooling mechanism (J2). The quenching suppresses the sintering of particles. The quenched solid solution fine particles are collected in the collection unit (E) connected to the pressure adjustment mechanism (F), and the pressure is controlled to 0.1 MPa to 138 MPa to suppress the boiling of the reducing agent. By increasing the pressure, the pressure of the entire device is increased, and the activity of the reaction in the reaction unit (D) is improved.

REFERENCE SIGNS LIST

100, 200, 300, 400 Supported catalyst synthesis device
500, 600, 700 Fine particle synthesis device
A Liquid feed route connecting between first source and reaction unit
B Liquid feed route connecting between second source and reaction unit
C Liquid feed route connecting between third source and reaction unit
(B, C) Shared route serving both as liquid feed route (B) and liquid feed route (C)
D Reaction unit
E Collection unit
F Pressure adjustment mechanism
G Mechanism that transfers liquid in one direction
H Stirring mechanism
I Heating and heat retention mechanism
J1, J2 Cooling mechanism
1 Second source for liquid containing elements to constitute single-metal fine particles or solid solution fine particles
2 Third source for liquid containing support particles
3 First source for liquid containing reducing agent
4 Fourth source for storing mixed liquid of liquid containing elements to constitute single-metal fine particles or solid solution fine particles to be supported and liquid containing support particles
10a Inhalation side ball
10b Discharge side ball
11a Inhalation side pipe
11b Discharge side pipe
12 Plunger
13 Space
14 Stirring impeller

What is claimed is:

1. A supported catalyst synthesis device comprising at least:
    a first source for a liquid containing a reducing agent;
    a second source for a liquid containing elements to constitute single-metal fine particles or solid solution fine particles to be supported;
    a third source for a liquid containing support particles;
    a reaction unit that joins flows of the liquid containing the reducing agent, the liquid containing the elements to constitute the single-metal fine particles or solid solution fine particles to be supported, and the liquid containing the support particles;
    a first liquid feed route connecting between the first source and the reaction unit;
    a second liquid feed route connecting between the second source and the reaction unit;
    a third liquid feed route connecting between the third source and the reaction unit;
    a collection unit, connected to the reaction unit via a pipe, to collect a produced reaction product; and
    a first cooling mechanism between the reaction unit and collection unit,
    wherein the supported catalyst synthesis device further comprises a pressure adjustment mechanism connected to the collection unit.

2. The supported catalyst synthesis device according to claim 1, further comprising a mechanism that transfers a liquid flowing through either the second liquid feed route or the third liquid feed route or both, in one direction.

3. The supported catalyst synthesis device according to claim 2, further comprising a heating and heat retention mechanism in the first liquid feed route.

4. The supported catalyst synthesis device according to claim 1, wherein the third liquid feed route includes a stirring mechanism.

5. The supported catalyst synthesis device according to claim 1, further comprising a heating and heat retention mechanism in the first liquid feed route.

6. The supported catalyst synthesis device according to claim 1, further comprising a second cooling mechanism in the second liquid feed route and/or the third liquid feed route.

7. A fine particle synthesis device comprising at least:
    a first source for a liquid containing a reducing agent;
    a second source for a liquid containing elements to constitute single-metal fine particles or solid solution fine particles;

a reaction unit that joins flows of the liquid containing the reducing agent, and the liquid containing the elements to constitute the single-metal fine particles or solid solution fine particles;

a first liquid feed route connecting between the first source and the reaction unit;

a second liquid feed route connecting between the second source and the reaction unit;

a collection unit, connected to the reaction unit via a pipe, to collect a produced reaction product; and a first cooling mechanism between the reaction unit and the collection unit, wherein the fine particle synthesis device further comprises a pressure adjustment mechanism connected to the collection unit.

8. The fine particle synthesis device according to claim 7, further comprising a mechanism that transfers a liquid flowing through the second liquid feed route in one direction.

9. The fine particle synthesis device according to claim 8, further comprising a heating and heat retention mechanism in the first liquid feed route.

10. The fine particle synthesis device according to claim 7, further comprising a heating and heat retention mechanism in the first liquid feed route.

* * * * *